United States Patent
Liu et al.

(10) Patent No.: US 11,520,833 B2
(45) Date of Patent: Dec. 6, 2022

(54) METHOD FOR DATA ITEM RECOMMENDATION, ELECTRONIC DEVICE AND STORAGE MEDIUM

(71) Applicant: EMC IP Holding Company LLC, Hopkinton, MA (US)

(72) Inventors: Bing Liu, Tianjin (CN); Ming Zhang, Shanghai (CN); Min Liu, Shanghai (CN); Yun Zhang, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/039,996

(22) Filed: Sep. 30, 2020

(65) Prior Publication Data
US 2022/0043862 A1  Feb. 10, 2022

(30) Foreign Application Priority Data
Aug. 7, 2020 (CN) .......................... 202010788498.8

(51) Int. Cl.
*G06F 16/9035* (2019.01)
*G06F 16/903* (2019.01)
(Continued)

(52) U.S. Cl.
CPC ...... *G06F 16/9035* (2019.01); *G06F 11/1402* (2013.01); *G06F 16/907* (2019.01); *G06F 16/90335* (2019.01)

(58) Field of Classification Search
CPC ............... G06F 16/9035; G06F 16/907; G06F 16/90335; G06F 11/1402; G06F 16/24542;
(Continued)

(56) References Cited

U.S. PATENT DOCUMENTS 8,656,454 B2 * 2/2014 Gunawardena ..... G06F 16/1752
726/1
2007/0234102 A1 * 10/2007 Fan .......................... H04W 4/02
714/4.4
(Continued)

OTHER PUBLICATIONS

Allcock, Bill et al. "Data management and transfer in high-performance computational grid environments", May 2002, Parallel Computing, vol. 28, Issue 5, pp. 749-771 (Year: 2002).*
(Continued)

*Primary Examiner* — William B Partridge
*Assistant Examiner* — Lana Alagic
(74) *Attorney, Agent, or Firm* — Chamberlain, Hrdlicka, White, Williams & Aughtry

(57) ABSTRACT

Embodiments of the present disclosure relate to a method, an electronic device, and a computer storage medium for data item recommendation, and relate to the field of information processing. According to this method, a request for a data item is received from a terminal device, the request includes an identifier for identifying the data item and an application type; the application type indicates a type of use of the data item; a recommendation criterion type matching the request is determined based on the application type, the recommendation criterion type indicates a type of a criterion based on which the data item is recommended, a plurality of data items associated with the identifier are determined the plurality of data items are located in a plurality of storage devices and based on the recommendation criterion type, a recommended data item is determined from the plurality of data items as a response.

15 Claims, 7 Drawing Sheets

(51) Int. Cl.
*G06F 16/907* (2019.01)
*G06F 11/14* (2006.01)

(58) Field of Classification Search
CPC ........ G06F 3/065; G06F 3/067; G06F 16/184;
G06F 16/1844; G06F 16/27; G06F
11/1464; G06F 16/148; G06F 16/9537;
G06F 16/908; G06F 16/909; H04L
29/08144; H04L 29/08153; H04L
29/08171; H04L 29/0818; H04L
29/08189; H04L 29/08198; H04L
29/08225; H04L 29/08234; G06Q 10/06;
G06Q 30/0282; E21B 41/0092
See application file for complete search history.

(56) References Cited

U.S. PATENT DOCUMENTS

| | | | | |
|---|---|---|---|---|
| 2008/0281784 A1* | 11/2008 | Zane | ................ | G06F 16/2471 |
| 2009/0259736 A1* | 10/2009 | Chang | ................ | H04L 67/1012 |
| | | | | 709/221 |
| 2015/0261468 A1* | 9/2015 | Khoyi | ................ | G06F 3/0653 |
| | | | | 711/114 |

OTHER PUBLICATIONS

March, S.T. and Rho, S., "Allocating data and operations to nodes in distributed database design," in IEEE Transactions on Knowledge and Data Engineering, vol. 7, No. 2, pp. 305-317, Apr. 1995, doi: 10.1109/69.382299. (Year: 1995).*

* cited by examiner

METHOD FOR DATA ITEM RECOMMENDATION, ELECTRONIC DEVICE AND STORAGE MEDIUM

CROSS-REFERENCE TO RELATED APPLICATIONS

This application claims priority to Chinese Patent Application No. 202010788498.8 filed on Aug. 7, 2020. Chinese Patent Application No. 202010788498.8 is hereby incorporated by reference in its entirety.

TECHNICAL FIELD

Embodiments of the present disclosure generally relate to the field of information processing, and in particular, to a method, an electronic device, and a computer storage medium for data item recommendation.

BACKGROUND

With the development of storage technology, the same data items can be stored in a plurality of storage devices for data protection. Data items may also be called data copies. Storage devices are often located in different geographic locations. When users want to recover, access, or browse data items from storage devices, a data protection search system can provide search services for the data items. However, a traditional solution only performs a file name matching search among a plurality of storage devices, and therefore cannot provide users with optimal data item recommendation.

SUMMARY OF THE INVENTION

A method, an electronic device, and a computer storage medium for data item recommendation are provided, which can recommend suitable data items based on application types and improve the accuracy of data item recommendation.

According to a first aspect of the present disclosure, a method for data item recommendation is provided. The method includes: receiving a request for a data item from a terminal device, the request including an identifier for identifying the data item and an application type, and the application type indicating a type of use of the data item; determining, based on the application type, a recommendation criterion type matching the request, the recommendation criterion type indicating a type of a criterion based on which the data item is recommended; determining a plurality of data items associated with the identifier, the plurality of data items being located in a plurality of storage devices; and determining, based on the recommendation criterion type, a recommended data item from the plurality of data items as a response to the request.

According to a second aspect of the present disclosure, an electronic device is provided. The electronic device includes: at least one processor; and a memory communicatively connected to the at least one processor. The memory stores instructions executable by the at least one processor. When executed by the at least one processor, the instructions enable the at least one processor to perform the method according to the first aspect.

In a third aspect of the present disclosure, a computer-readable storage medium is provided. A computer program is stored thereon. When executed by a processor, the program implements the method according to the first aspect of the present disclosure.

It should be understood that the content described in the present section is neither intended to identify key or essential features of the embodiments of the present disclosure, nor intended to limit the scope of the present disclosure. Other features of the present disclosure will become readily understandable from the following specification.

BRIEF DESCRIPTION OF THE DRAWINGS

The above-mentioned and other features, advantages, and aspects of the embodiments of the present disclosure will become more apparent with reference to the accompanying drawings and the following detailed description. In the accompanying drawings, identical or similar reference numerals represent identical or similar elements, in which.

DETAILED DESCRIPTION

Figure 1:
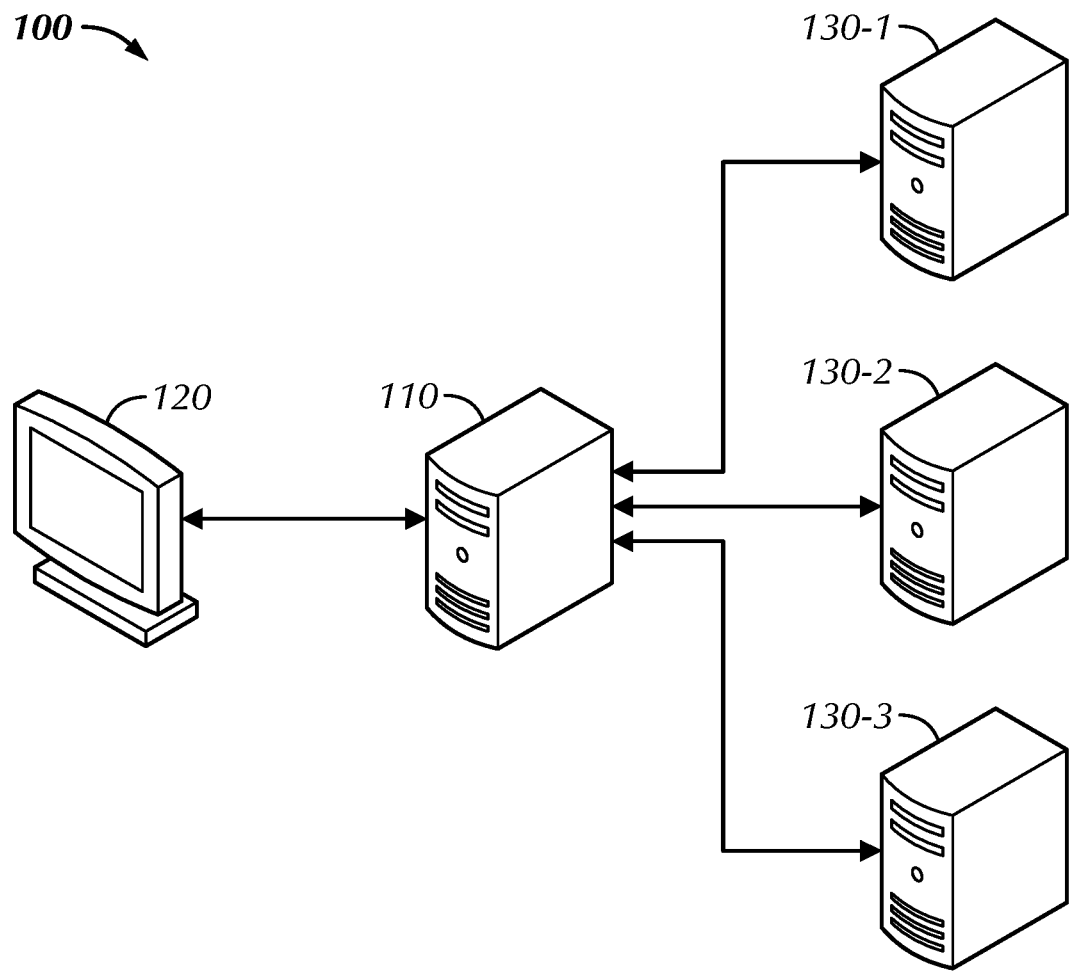
FIG. 1 is a schematic diagram of information processing environment 100 according to an embodiment of the present disclosure.

The following describes example embodiments of the present disclosure with reference to the accompanying drawings, which includes various details of the embodiments of the present disclosure to facilitate understanding, and should be regarded as merely examples. Therefore, those of ordinary skill in the art should recognize that various changes and modifications may be made to the embodiments described herein without departing from the scope and spirit of the present disclosure. Likewise, for clarity and conciseness, descriptions of well-known functions and structures are omitted in the following description.

The term "include" and its variants as used herein indicate open-ended inclusion, i.e., "including, but not limited to." Unless specifically stated, the term "or" indicates "and/or." The term "based on" indicates "based at least in part on." The terms "an example embodiment" and "an embodiment" indicate "at least one example embodiment." The term "another embodiment" indicates "at least one additional embodiment." The terms "first," "second," etc. may refer to different or identical objects. Other explicit and implicit definitions may also be included below.

As described above, a traditional solution only performs a file name matching search among a plurality of storage devices, and therefore cannot provide users with optimal data item recommendations.

Specifically, for fault tolerance and high availability, a data protection center usually deploys a plurality of copies of data across storage devices 130 in different geographic locations. For example, through a replication technology, user A may have 3 copies of business data stored across a storage device located in Shanghai, a storage device located in Beijing, and a storage device located in Santa Clara. When user A searches a data protection search system for file X for disaster recovery, it is helpful to recommend a data copy on a storage device that can provide optimal recovery performance.

In addition, more and more data protection solutions put backup data in a cloud. For example, user B has 3 data copies stored across a storage device of a first cloud service provider, a storage device of a second cloud service provider, and a storage device of a third cloud service provider. Now, user B wants to perform data mining (such as big data analysis) on the backup data to improve business processes. These tasks are not very critical, accordingly the user wants to reduce the financial expense of recovering or accessing this data. Payment strategies (or expenses) for reading data copies from storage devices of different cloud service providers are different. In this case, users may hope that the data copies that can be provided are located on the storage device with the minimum expense.

In order to at least partially solve the above problems and one or more of other potential problems, a solution for data item recommendation is proposed in example embodiments of the present disclosure. In this solution, a computing device receives a request for a data item from a terminal device. The request includes an identifier for identifying the data item and an application type, and the application type indicates a type of use of the data item. The computing device determines, based on the application type, a recommendation criterion type matching the request, that is, determines a type of a criterion based on which the data item is recommended. The computing device then determines, based on the recommendation criterion type, a recommended data item from a plurality of data items, associated with the identifier in the received request and located at a plurality of storage devices, as a response to the request. In this way, suitable data items can be recommended based on an application type, and the accuracy of data item recommendation can be improved.

In the following, specific examples of the solution will be described in more detail with reference to the accompanying drawings.

FIG. 1 shows a schematic diagram of an example of information processing environment 100 according to an embodiment of the present disclosure. Information processing environment 100 may include computing device 110, terminal device 120, and storage devices 130-1, 130-2, and 130-3 (collectively referred to as 130). It should be understood that although three storage devices are shown in FIG. 1, this is only an example, and more or fewer storage devices may also be included.

Computing device 110 may store metadata associated with a data item. The metadata may include information such as an identifier of the data item, and an identifier and position of a storage device where the data item is located. Computing device 110 may also store a user profile associated with terminal device 120. Computing device 110 may determine a recommended data item as a response based on a request for the data item from terminal device 120.

For example, computing device 110 includes, but is not limited to, a server computer, a multiprocessor system, a mainframe computer, a distributed computing environment including any one of the above-mentioned systems or devices, etc. In some embodiments, computing device 110 may have one or more processing units, including a special-purpose processing unit such as a graphics processing unit (GPU), a field programmable gate array (FPGA), and an application-specific integrated circuit (ASIC) and a general-purpose processing unit such as a central processing unit (CPU).

Terminal device 120 may send a request for a data item to computing device 110. The request may include an identifier for identifying the data item and an application type. The application type indicates a type of a user of the data item, such as disaster recovery and data analysis. For example, terminal device 120 includes, but is not limited to, a personal computer, a desktop computer, a tablet computer, a laptop computer, a smart phone, a personal digital assistant, etc.

The same data items may be stored in a plurality of storage devices 130 for protection. Data items may also be called data copies. The plurality of storage devices 130 may be located in different positions, such as Shanghai, Beijing, and Hong Kong. Storage device 130 includes, but is not limited to, a storage server.

Computing device 110 is configured to: receive a request for a data item from terminal device 120, the request including an identifier for identifying the data item and an application type, and the application type indicating a type of use of the data item; determine, based on the application type, a recommendation criterion type matching the request, the recommendation criterion type indicating a type of a criterion based on which the data item is recommended; determine a plurality of data items associated with the identifier, the plurality of data items being located in a plurality of storage devices 130; and determine, based on the recommendation criterion type, a recommended data item from the plurality of data items as a response to the request.

Therefore, suitable data items can be recommended based on an application type, and the accuracy of data item recommendation can be improved.

Figure 2:
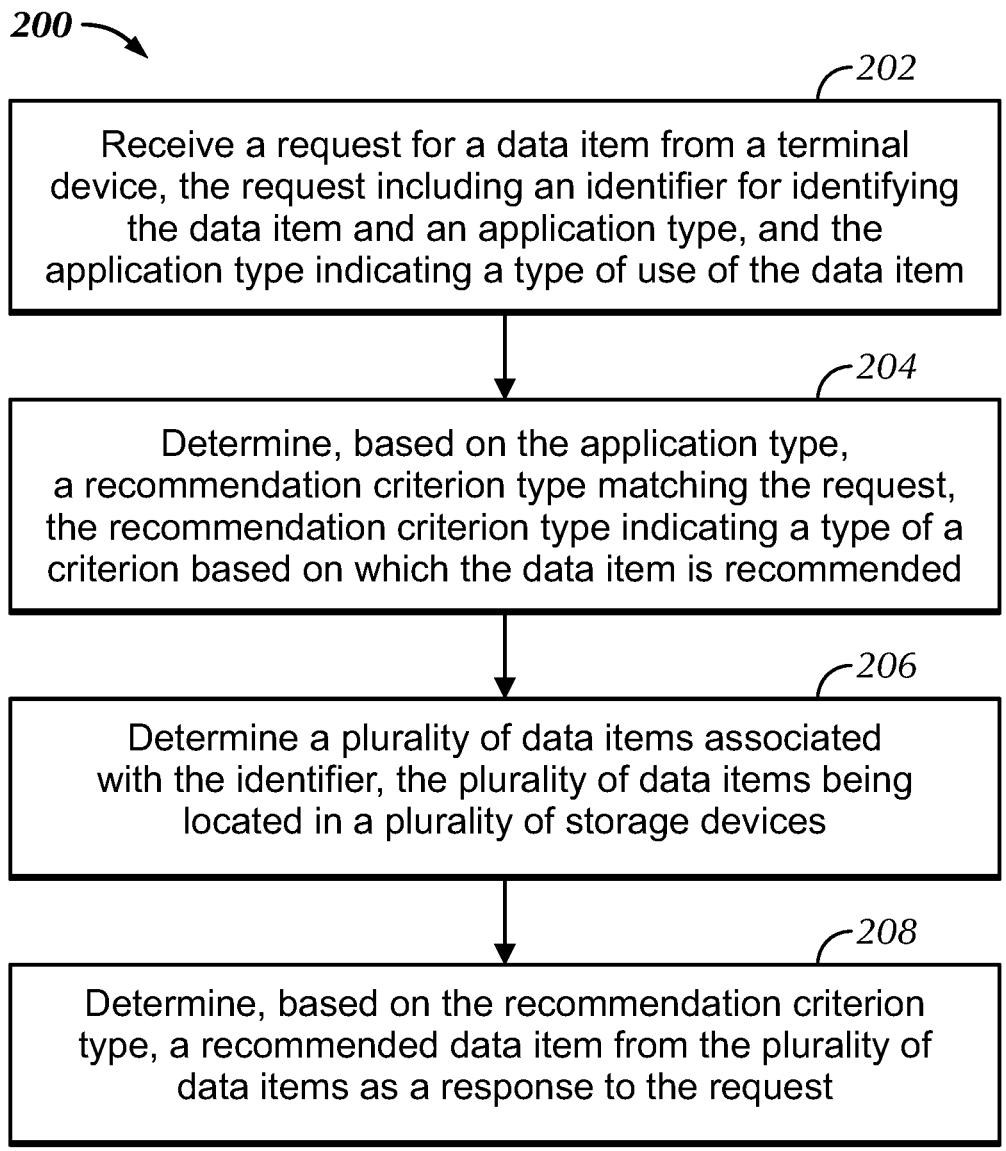
FIG. 2 is a schematic diagram of method 200 for data item recommendation according to an embodiment of the present disclosure.

FIG. 2 shows a flowchart of method 200 for data item recommendation according to an embodiment of the present disclosure. For example, method 200 may be performed by computing device 110 as shown in FIG. 1. It should be understood that method 200 may also include additional blocks that are not shown and/or may omit blocks that are shown, and the scope of the present disclosure is not limited in this regard.

At block 202, computing device 110 receives a request for a data item from terminal device 120. The request includes an identifier for identifying the data item and an application type. The application type indicates a type of use of the data item. For example, the application type may be related to disaster recovery or may be related to data analysis, etc.

At block 204, computing device 110 determines, based on the application type, a recommendation criterion type matching the request. The recommendation criterion type indicates a type of a criterion based on which the data item is recommended. For example, the recommendation criterion type includes, but is not limited to, a performance-sensitive type and a cost-sensitive type.

In some embodiments, computing device 110 may determine whether the application type is related to disaster recovery. If computing device 110 determines that the application type is related to disaster recovery, the recommendation criterion type may be determined as a performance-sensitive type.

Alternatively or additionally, in some embodiments, computing device 110 may determine whether the application type is related to data analysis. If computing device 110 determines that the application type is related to data analysis, the recommendation criterion type may be determined as a cost-sensitive type.

Therefore, it is possible to determine whether the recommendation criterion type is a performance-sensitive type or a cost-sensitive type based on whether the application type is related to disaster recovery or data analysis, so that the recommendation of data items used for disaster recovery and data analysis is more accurately in line with user demands.

In some embodiments, before determining the recommendation criterion type based on the application type, computing device 110 may also search a user profile associated with terminal device 120 for a configuration item associated with the recommendation criterion type. The configuration item associated with the recommendation criterion type may be, for example, previously configured by a user in computing device 110.

If computing device 110 finds the configuration item in the user profile, the recommendation criterion type is determined based on the configuration item. For example, if the configuration item indicates a performance-sensitive type, the recommendation criterion type is determined as the performance-sensitive type, and if the configuration item indicates a cost-sensitive type, the recommendation criterion type is determined as the cost-sensitive type. If the computing device does not find the configuration item in the user profile, the recommendation criterion type is determined based on the application type.

Therefore, the recommendation criterion type for the data item can be determined based on the user configuration regarding the recommendation criterion type before the application type, so that the recommended data item is more in line with user demands.

Returning to FIG. 2, at block 206, computing device 110 determines a plurality of data items associated with the identifier. The plurality of data items are located in a plurality of storage devices 130.

At block 208, computing device 110 determines, based on the recommendation criterion type, a recommended data item from the plurality of data items as a response to the request. The method for determining a recommended data item will be described in detail below with reference to FIGS. 3-5.

Therefore, it is possible to determine a recommendation criterion type matching a request based on user context information such as an application type, and to determine a recommended data item based on the recommendation criterion type, so that the recommended data item is more in line with user demands, thereby improving the accuracy and satisfaction of data item recommendation.

Figure 3:
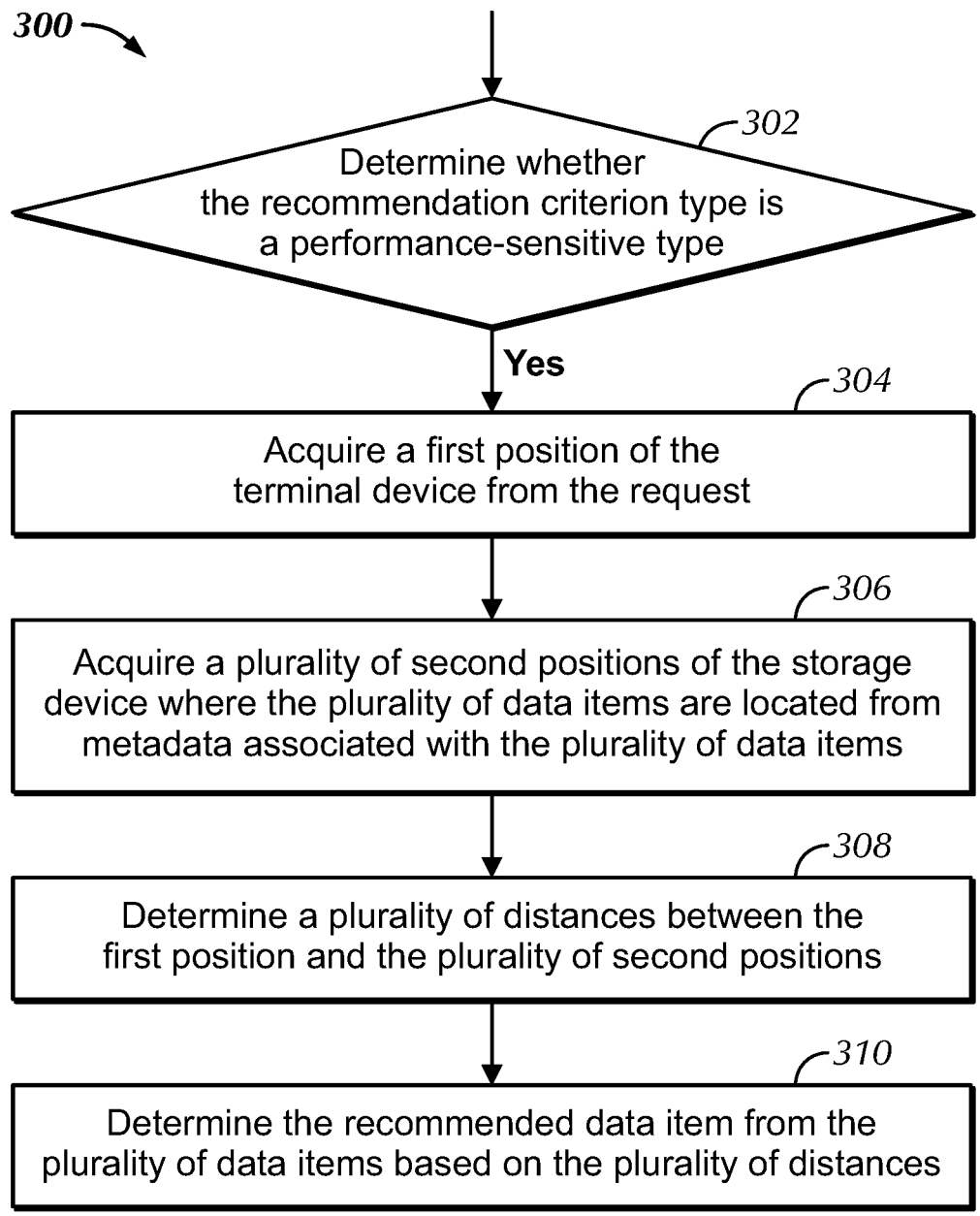
FIG. 3 is a schematic diagram of method 300 for determining a recommended data item according to an embodiment of the present disclosure.

FIG. 3 shows a flowchart of method 300 for determining a recommended data item according to an embodiment of the present disclosure. For example, method 300 may be performed by computing device 110 as shown in FIG. 1. It should be understood that method 300 may also include additional blocks that are not shown and/or may omit blocks that are shown, and the scope of the present disclosure is not limited in this regard.

At block 302, computing device 110 determines whether the recommendation criterion type is a performance-sensitive type.

If computing device 110 determines that the recommendation criterion type is a performance-sensitive type at block 302, a first position of terminal device 120 is acquired from the request at block 304. For example, the request may include cookie information, and the cookie information may include the first position of terminal device 120. For example, the first position of terminal device 120 is Hangzhou.

At block 306, computing device 110 acquires a plurality of second positions of storage device 130 where the plurality of data items are located from metadata associated with the plurality of data items. Three data items are taken as an example. The three data items are located in three storage devices 130, respectively. The second positions of three storage devices 130 are, for example, Shanghai, Beijing, and Shenzhen, respectively.

At block 308, computing device 110 determines a plurality of distances between the first position and the plurality of second positions. Continuing the above example, three distances between the first position and the three second positions are, for example, 200 kilometers, 1,500 kilometers, and 1,000 kilometers, respectively.

At block 310, computing device 110 determines the recommended data item from the plurality of data items based on the plurality of distances. For example, the distance between the second position and the first position of storage device 130 where the recommended data item is located is the shortest among the plurality of distances. Continuing the above example, the recommended data item is, for example, a data item in storage device 130 located in Shanghai. It should be understood that the above is only for illustration, and the scope of the present disclosure is not limited herein.

Therefore, it is possible to recommend data items based on the distance between a storage device and a terminal device when the recommendation criterion type is a performance-sensitive type, so as to achieve optimal performance.

In some cases, the distance is not closely related to network performance. For example, some high-speed networks are deployed in long-distance storage devices 130, which have high delay (depending on distance) but high throughput. In this case, the network performance associated with storage device 130, such as delay, throughput, a data packet loss rate, or other run-time network performance indicators, may also be considered. For another example, one busy local storage device 130 is located close to terminal device 120 of a user, but exhibits low performance due to its heavy workload. In this case, the system performance associated with storage device 130, such as input and output performance, processor performance, memory performance, or other system-level operating performance indicators, may also be considered.

Figure 4:
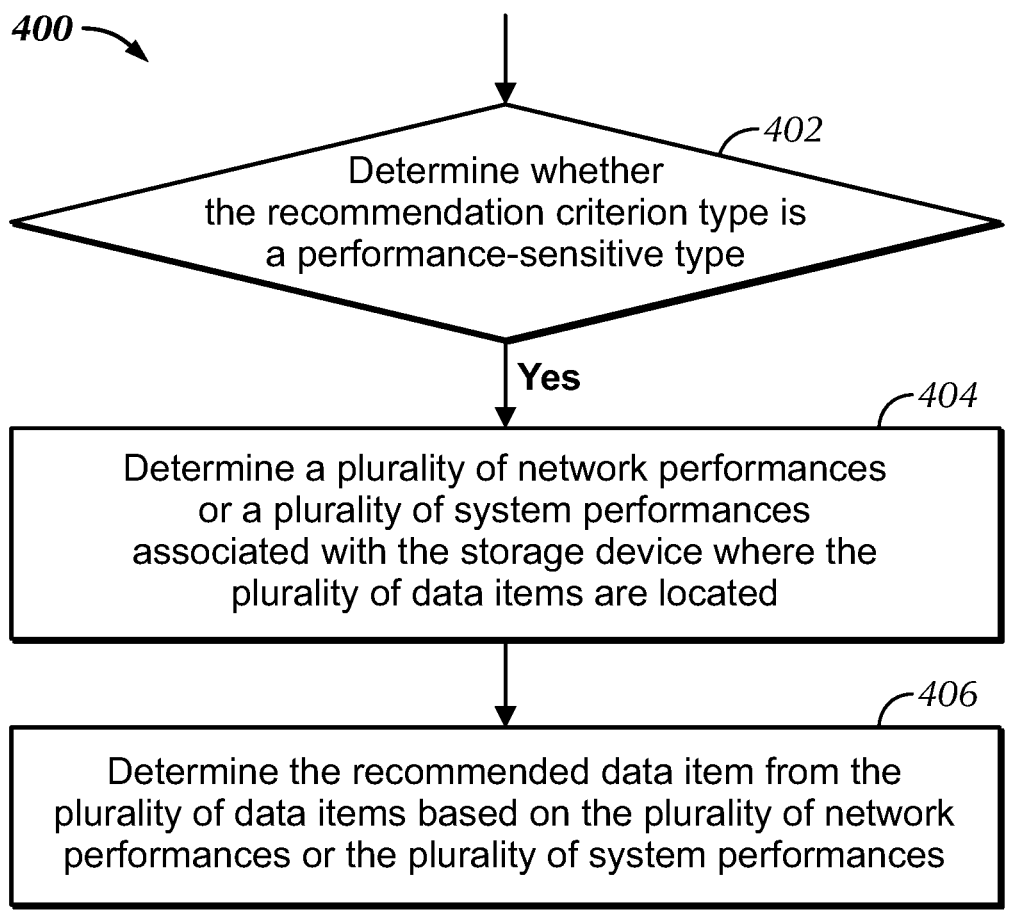
FIG. 4 is a schematic diagram of method 400 for determining a recommended data item according to an embodiment of the present disclosure.

FIG. 4 shows a flowchart of method 400 for determining a recommended data item according to an embodiment of the present disclosure. For example, method 400 may be performed by computing device 110 as shown in FIG. 1. It should be understood that method 400 may also include additional blocks that are not shown and/or may omit blocks that are shown, and the scope of the present disclosure is not limited in this regard.

At block 402, computing device 110 determines whether the recommendation criterion type is a performance-sensitive type.

If computing device 110 determines the recommendation criterion type as a performance-sensitive type at block 402, a plurality of network performances or a plurality of system performances associated with storage device 130 where the plurality of data items are located are determined at block 404. Examples of the network performance and the system performance may be found above and will not be repeated.

At block 406, computing device 110 determines the recommended data item from the plurality of data items based on the plurality of network performances or the plurality of system performances. For example, the network performance associated with storage device 130 where the recommended data item is located is optimal, such as maximum throughput and a minimum packet loss rate, or the system performance associated therewith is optimal, such as optimal input and output performance, optimal processor performance, and maximum memory space.

Therefore, it is possible to recommend data items based on the network performance or the system performance associated with the storage device when the recommendation criterion type is a performance-sensitive type, so as to achieve the optimal performance.

Figure 5:
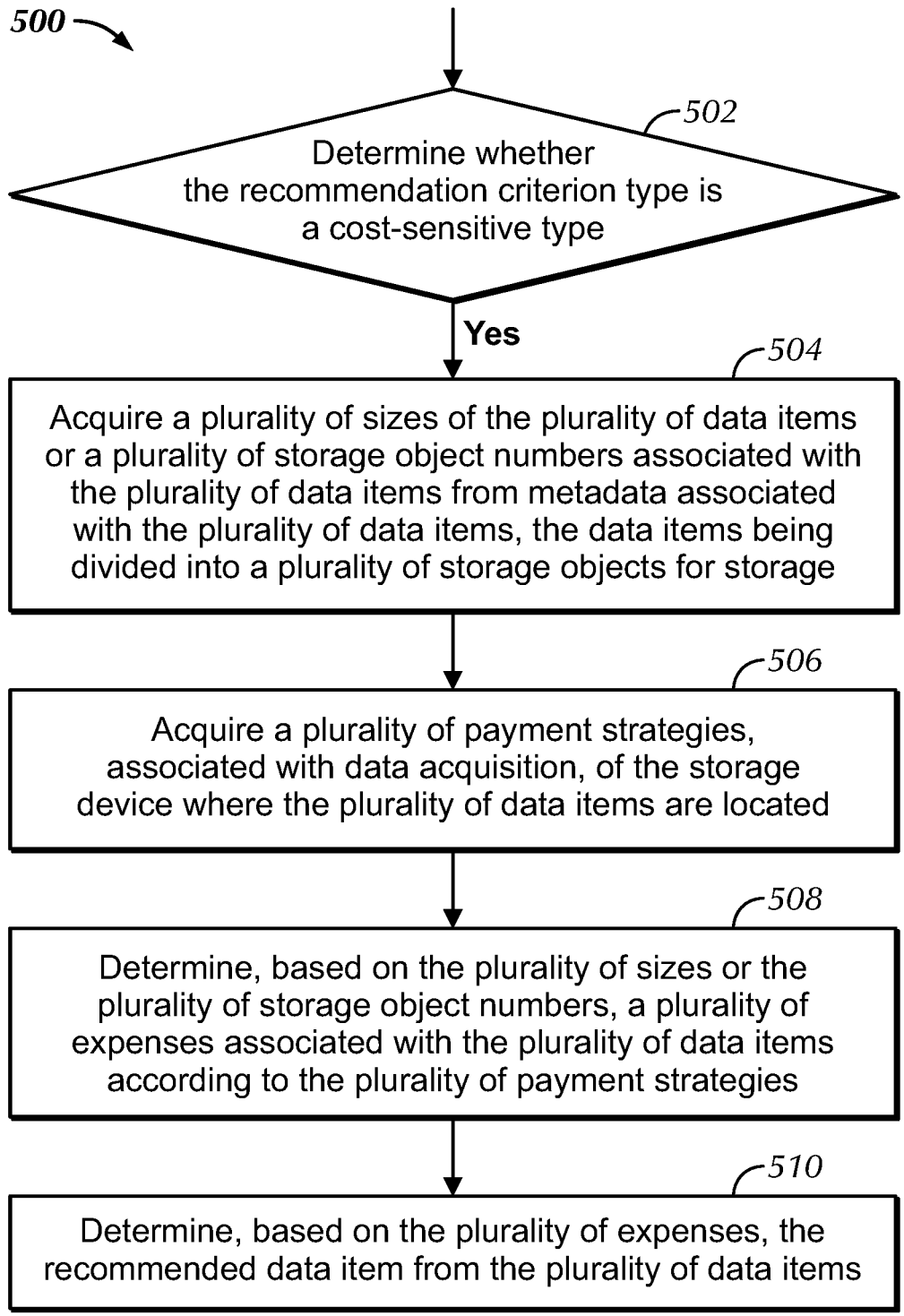
FIG. 5 is a schematic diagram of method 500 for determining a recommended data item according to an embodiment of the present disclosure.

FIG. 5 shows a flowchart of method 500 for determining a recommended data item according to an embodiment of the present disclosure. For example, method 500 may be performed by computing device 110 as shown in FIG. 1. It should be understood that method 500 may also include additional blocks that are not shown and/or may omit blocks that are shown, and the scope of the present disclosure is not limited in this regard.

At block 502, computing device 110 determines whether the recommendation criterion type is a cost-sensitive type.

If computing device 110 determines the recommendation criterion type as a cost-sensitive type at block 502, a plurality of sizes of the plurality of data items or a plurality of storage object numbers associated with the plurality of data items are acquired from metadata associated with the plurality of data items at block 504. The data items are divided into a plurality of storage objects for storage. For example, a data item may be divided into a plurality of parts. Each part may be stored according to one storage object, so that the data item may be associated with a plurality of storage objects.

At block 506, computing device 110 acquires a plurality of payment strategies, associated with data acquisition, of storage device 130 where the plurality of data items are located. For example, the payment strategy includes, but is not limited to, the expense of reading data of 1 GB, the expense of acquiring 1,000 storage objects, etc. Computing device 110 may, for example, send a plurality of requests for acquiring payment strategies to a plurality of storage devices 130 or a plurality of servers that manage the plurality of storage devices 130, and receive a plurality of payment strategies accordingly.

In some embodiments, the payment strategy may also be related to the positions of terminal device 120 and storage device 130. For example, for a certain storage device 130 or cloud service provider, payment strategies for data acquisition between different positions are different. Specifically, computing device 110 may also acquire a first position of terminal device 120 from the request, acquire a plurality of second positions of storage device 130 where the plurality of data items are located from metadata associated with the plurality of data items, and acquire a plurality of payment strategies, associated with data acquisition between the first position and the plurality of second positions, of the storage device where the plurality of data items are located. For example, computing device 110 may include a first position and a second position in the above request for acquiring payment strategies, so as to acquire the payment strategies associated with data acquisition between the first position and the second position. Therefore, payment strategies associated with the positions of the terminal device and the storage device can be acquired.

At block 508, computing device 110 determines, based on a plurality of sizes or a plurality of storage object numbers, a plurality of expenses associated with the plurality of data items according to the plurality of payment strategies.

At block 510, computing device 110 determines, based on the plurality of expenses, the recommended data item from the plurality of data items. For example, the storage device where the recommended data item is located has the minimum cost.

Therefore, it is possible to recommend data items based on data acquisition expenses associated with the storage device when the recommendation criterion type is a cost-sensitive type, so as to achieve the minimum cost.

A schematic block diagram according to an embodiment of the present disclosure will be described below with reference to FIG. 6.

Figure 6:
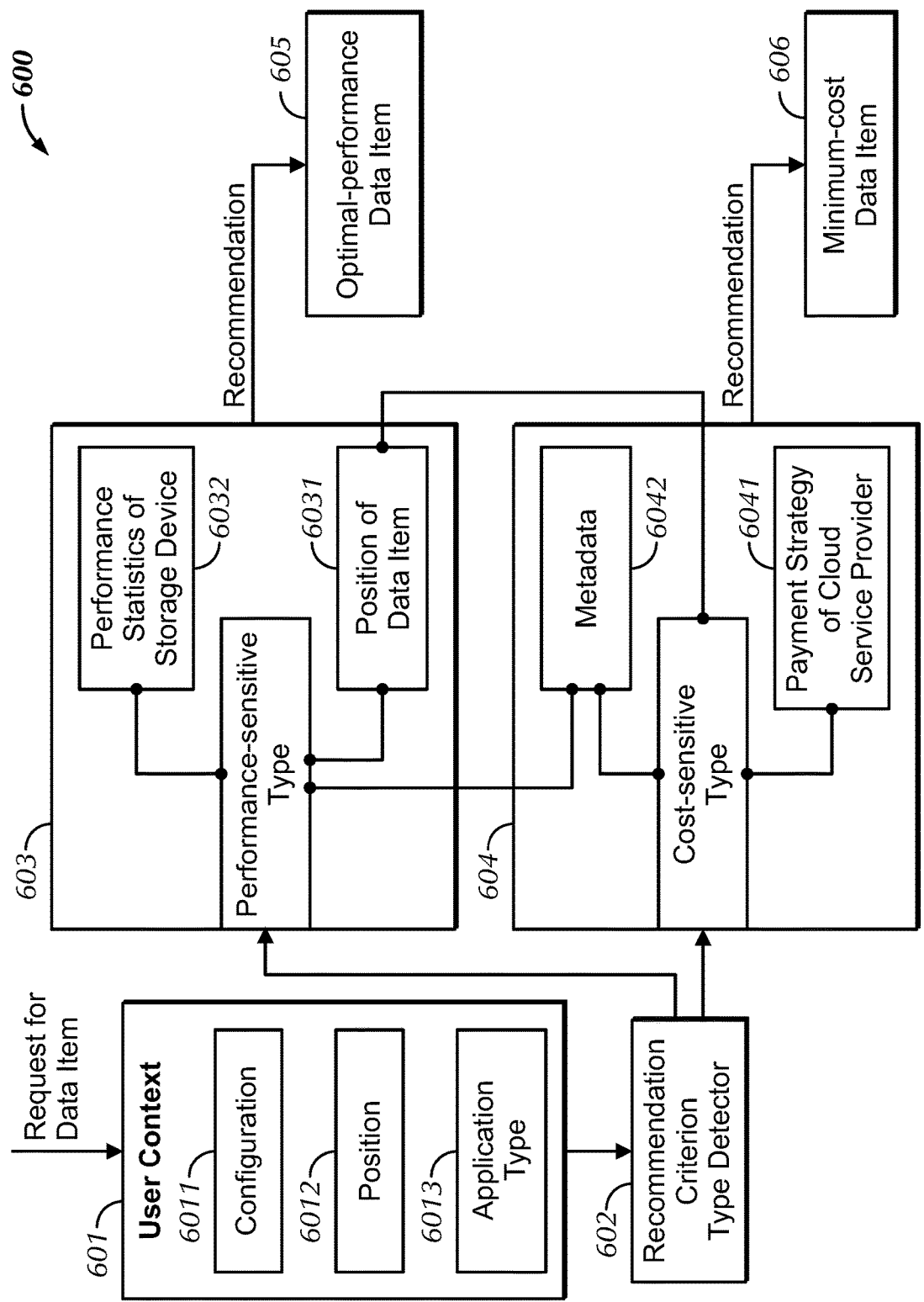
FIG. 6 is a schematic block diagram of process 600 for data item recommendation according to an embodiment of the present disclosure.

As shown in FIG. 6, after receiving a request for a data item from terminal device 120, computing device 110 acquires user context information at block 601, such as configuration item 6011 in a user profile that is associated with a recommendation criterion type, position 6012 of terminal device 120, and application type 6013.

Subsequently, recommendation criterion type detector 602 determines the recommendation criterion type based on the acquired user context information, such as the application type and the configuration item.

If the recommendation criterion type is a performance-sensitive type, optimal-performance data item 605 is recommended as a response to the request at block 603 based on position 6031 of a storage device where the data items are located and performance statistical data 6032 associated with the storage device such as a network performance and/or a system performance.

If the recommendation criterion type is a cost-sensitive type, minimum-cost data item 606 is recommended as a response to the request at block 604 based on payment strategy 6041 of a cloud service provider and a data item size included in metadata 6042 or a storage object number associated with the data item.

Therefore, the recommendation criterion type for the data item can be determined based on the user context such as the application type or user configuration, and the optimal-performance data item and the minimum-cost data item can be recommended in the case of the performance-sensitive type and the cost-sensitive type, respectively.

Figure 7:
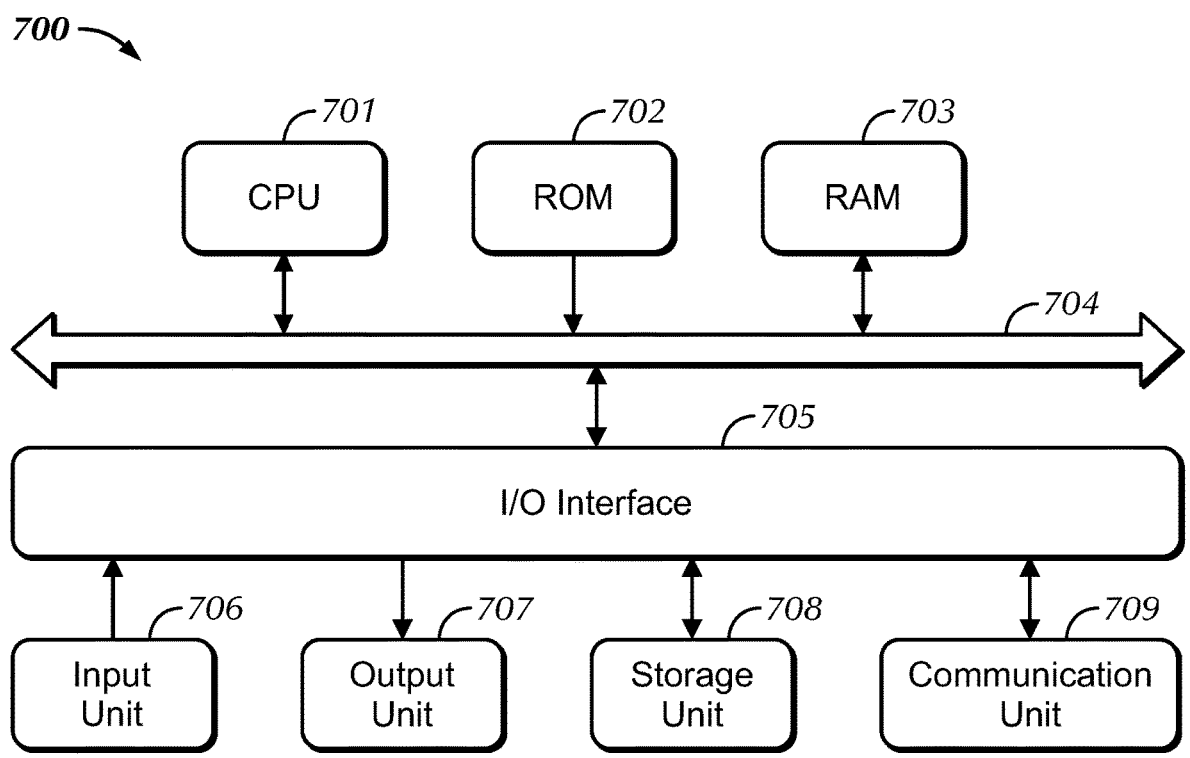
FIG. 7 is a block diagram of an electronic device used to implement a method for data item recommendation according to an embodiment of the present disclosure.

FIG. 7 is a schematic block diagram of example device 700 that may be used to implement an embodiment of the present disclosure. For example, computing device 110 as shown in FIG. 1 may be implemented by device 700. As shown in the figure, device 700 includes (CPU) 701 that may perform various appropriate actions and processing according to computer program instructions stored in read-only memory (ROM) 702 or computer program instructions loaded from storage unit 708 to random access memory (RAM) 703. Various programs and data required for operations of device 700 may also be stored in RAM 703. CPU 701, ROM 702, and RAM 703 are connected to each other through bus 704. Input/output (I/O) interface 705 is also connected to bus 704.

A plurality of components in device 700 are connected to I/O interface 705, including: input unit 706, such as a keyboard, a mouse, and a microphone; output unit 707, such as various types of displays and speakers; storage unit 708, such as a magnetic disk and an optical disc; and communication unit 709, such as a network card, a modem, and a wireless communication transceiver. Communication unit 709 allows device 700 to exchange information/data with other devices over a computer network such as the Internet and/or various telecommunication networks.

The various processes and processing described above, for example, methods 200-500, may be performed by processing unit 701. For example, in some embodiments, methods 200-500 may be implemented as a computer software program that is tangibly included in a machine-readable medium such as storage unit 708. In some embodiments, part or all of the computer program may be loaded and/or installed onto device 700 via ROM 702 and/or communication unit 709. When the computer program is loaded into RAM 703 and executed by CPU 701, one or more actions of methods 200-500 described above may be implemented.

The present disclosure relates to a method, an apparatus, a system, an electronic device, a computer-readable storage medium, and/or a computer program product. The computer program product may include computer-readable program instructions for performing various aspects of the present disclosure.

The computer-readable storage medium may be a tangible device capable of retaining and storing instructions used by an instruction-executing device. For example, the computer-readable storage medium may be, but is not limited to, an electrical storage device, a magnetic storage device, an optical storage device, an electromagnetic storage device, a semiconductor storage device, or any appropriate combination of the above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device such as a punch card or a raised structure in a groove having instructions stored thereon, and any suitable combination thereof. The computer-readable storage medium used here is not construed as transient signals themselves, such as radio waves or other freely propagating electromagnetic waves, electromagnetic waves propagating through waveguides or other transmission media (for example, optical pulses through fiber-optic cables), or electrical signals transmitted through electrical wires.

The computer-readable program instructions described herein may be downloaded from a computer-readable storage medium to various computing/processing devices, or downloaded to an external computer or external storage device via a network such as the Internet, a local area network, a wide area network, and/or a wireless network. The network may include copper transmission cables, optical fiber transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages. The programming languages include object-oriented programming languages such as Smalltalk and C++ and conventional procedural programming languages such as "C" language or similar programming languages. The computer-readable program instructions may be executed entirely on a user computer, partly on a user computer, as a standalone software package, partly on a user computer and partly on a remote computer, or entirely on a remote computer or a server. In the case where a remote computer is involved, the remote computer may be connected to a user computer over any kind of networks, including a local area network (LAN) or a wide area network (WAN), or may be connected to an external computer (e.g., connected over the Internet using an Internet service provider). In some embodiments, an electronic circuit, such as a programmable logic circuit, an FPGA, or a programmable logic array (PLA), is customized by utilizing state information of the computer-readable program instructions. The electronic circuit may execute the computer-readable program instructions so as to implement various aspects of the present disclosure.

Various aspects of the present disclosure are described here with reference to flowcharts and/or block diagrams of the methods, the apparatuses (systems), and the computer program products according to the embodiments of the present disclosure. It should be understood that each block in the flowcharts and/or block diagrams as well as a combination of blocks in the flowcharts and/or block diagrams may be implemented by using the computer-readable program instructions.

The computer-readable program instructions may be provided to a processing unit of a general purpose computer, a special purpose computer, or other programmable data processing apparatuses to produce a machine, such that the instructions, when executed by the processing unit of the computer or other programmable data processing apparatuses, generate an apparatus for implementing the functions/actions specified in one or more blocks in the flowcharts and/or block diagrams. The computer-readable program instructions may also be stored in a computer-readable storage medium, to cause a computer, a programmable data processing apparatus, and/or other devices to work in a specific manner, such that the computer-readable medium storing the instructions includes an article of manufacture that contains instructions for implementing various aspects of the functions/actions specified in one or more blocks in the flowcharts and/or block diagrams.

The computer-readable program instructions may also be loaded onto a computer, other programmable data processing apparatuses, or other devices, so that a series of operating steps are performed on the computer, other programmable data processing apparatuses, or other devices to produce a computer-implemented process, so that the instructions executed on the computer, other programmable data processing apparatuses, or other devices implement the functions/actions specified in one or more blocks in the flowcharts and/or block diagrams.

The flowcharts and block diagrams in the accompanying drawings show the architectures, functionalities, and operations of possible implementations of the system, the method, and the computer program product according to a plurality of embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, the functions marked in the blocks may also occur in an order different from that marked in the accompanying drawings. For example, two successive blocks may actually be performed basically in parallel, or they may be performed in an opposite order sometimes, depending on the functions involved. It should be further noted that each block in the block diagrams and/or flowcharts as well as a combination of blocks in the block diagrams and/or flowcharts may be implemented by using a dedicated hardware-based system for executing specified functions or actions or by a combination of dedicated hardware and computer instructions.

The embodiments of the present disclosure have been described above. The above description is illustrative, rather than exhaustive, and is not limited to the disclosed embodiments. Numerous modifications and alterations are apparent to those of ordinary skill in the art without departing from the scope and spirit of the illustrated various embodiments. The selection of terms as used herein is intended to best explain the principles and practical applications of the various embodiments or technical improvements to technologies on the market, or to enable other persons of ordinary skill in the art to understand the embodiments disclosed herein.

The invention claimed is:

1. A method for data item recommendation, comprising:
   receiving a request for a data item from a terminal device, the request comprising an identifier for identifying the data item and a type of use of the data item;
   determining an application type at least based on the type of use of the data item, wherein the type of use is determined as being either related to disaster recovery or data analysis;
   determining, based on the application type, a recommendation criterion type matching the request;
   determining a plurality of data items associated with the identifier, the plurality of data items being located in a plurality of storage devices, wherein at least some of the plurality of storage devices are located in a different geographic location; and
   determining, based on the recommendation criterion type, a recommended data item from the plurality of data items as a response to the request,
      wherein if the recommendation criterion type is determined as a performance-sensitive type, determining, based on where the plurality of data items are located, a plurality of network performances or a plurality of system performances associated with the plurality of storage devices, and determining, based on the plurality of network performances or the plurality of system performances, the recommended data item from the plurality of data items; and
   wherein a network performance of the plurality of network performances comprises at least one of delay, throughput, and a data packet loss rate, and the system performance of the plurality of system performances comprises at least one of input and output performance, processor performance, and memory performance.

2. The method according to claim 1, wherein determining the recommendation criterion type comprises:
   determining that the recommendation criterion type is a performance-sensitive type, if it is determined that the application type is related to the disaster recovery type of use; and
   determining that the recommendation criterion type is a cost-sensitive type, if it is determined that the application type is related to the data analysis type of use.

3. The method according to claim 1, wherein determining the recommended data item comprises:
   if the recommendation criterion type is determined as a performance-sensitive type,
   acquiring a first position of the terminal device from the request;
   acquiring a plurality of second positions of the plurality of storage devices where the plurality of data items are located from metadata associated with the plurality of data items;
   determining a plurality of distances between the first position and the plurality of second positions; and
   determining, based on the plurality of distances, the recommended data item from the plurality of data items.

4. The method according to claim 1, wherein determining the recommended data item comprises:
   if the recommendation criterion type is determined as a cost-sensitive type, acquiring at least one of:
      a plurality of sizes of the plurality of data items;
      a plurality of storage object numbers associated with the plurality of data items from metadata associated with the plurality of data items, the plurality of data items being divided into a plurality of storage objects for storage;
   acquiring a plurality of payment strategies, associated with data acquisition, of the plurality of storage devices where the plurality of data items are located;
   determining, based on the plurality of sizes or the plurality of storage object numbers, a plurality of expenses associated with the plurality of data items according to the plurality of payment strategies; and
   determining, based on the plurality of expenses, the recommended data item from the plurality of data items.

5. The method according to claim 4, wherein acquiring the plurality of payment strategies comprises:
   acquiring a first position of the terminal device from the request;
   acquiring a plurality of second positions of the plurality of storage devices where the plurality of data items are located from metadata associated with the plurality of data items; and
   acquiring a plurality of payment strategies, associated with data acquisition between the first position and the plurality of second positions, of the plurality of storage devices where the plurality of data items are located.

6. The method according to claim 1, further comprising:
   searching a user profile associated with the terminal device for a configuration item associated with the recommendation criterion type;
   determining, if the configuration item is found in the user profile, the recommendation criterion type based on the configuration item; and
   determining, if the configuration item is not found in the user profile, the recommendation criterion type based on the application type.

7. An electronic device, comprising:
   at least one processor; and
   a memory communicatively connected to the at least one processor, wherein
   the memory stores instructions executable by the at least one processor, and when executed by the at least one processor, the instructions enable the at least one processor to perform a method comprising:
      receiving a request for a data item from a terminal device, the request comprising an identifier for identifying the data item and a type of use of the data item;

determining an application type at least based on the type of use of the data item, wherein the type of use is determined as being either related to disaster recovery or data analysis;

determining, based on the application type, a recommendation criterion type matching the request;

determining a plurality of data items associated with the identifier, the plurality of data items being located in a plurality of storage devices, wherein at least some of the plurality of storage devices are located in a different geographic location; and determining, based on the recommendation criterion type, a recommended data item from the plurality of data items as a response to the request, wherein if the recommendation criterion type is determined as a performance-sensitive type, determining, based on where the plurality of data items are located, a plurality of network performances or a plurality of system performances associated with the plurality of storage devices, and determining, based on the plurality of network performances or the plurality of system performances, the recommended data item from the plurality of data items; and wherein a network performance of the plurality of network performances comprises at least one of delay, throughput, and a data packet loss rate, and the system performance of the plurality of system performances comprises at least one of input and output performance, processor performance, and memory performance.

8. The electronic device according to claim 7, wherein determining the recommendation criterion type comprises:

determining that the recommendation criterion type is a performance-sensitive type, if it is determined that the application type is related to the disaster recovery type of use; and determining, that the recommendation criterion type is a cost-sensitive type, if it is determined that the application type is related to the data analysis type of use.

9. The electronic device according to claim 7, wherein determining the recommended data item comprises:

if the recommendation criterion type is determined as a performance-sensitive type, acquiring a first position of the terminal device from the request;

acquiring a plurality of second positions of the plurality of storage devices where the plurality of data items are located from metadata associated with the plurality of data items;

determining a plurality of distances between the first position and the plurality of second positions; and determining, based on the plurality of distances, the recommended data item from the plurality of data items.

10. The electronic device according to claim 7, wherein determining the recommended data item comprises:

if the recommendation criterion type is determined as a cost-sensitive type, acquiring at least one of:

a plurality of sizes of the plurality of data items, or a plurality of storage object numbers associated with the plurality of data items from metadata associated with the plurality of data items, the plurality of data items being divided into a plurality of storage objects for storage;

acquiring a plurality of payment strategies, associated with data acquisition, of the plurality of storage devices where the plurality of data items are located;

determining, based on the plurality of sizes or the plurality of storage object numbers, a plurality of expenses associated with the plurality of data items according to the plurality of payment strategies; and determining, based on the plurality of expenses, the recommended data item from the plurality of data items.

11. The electronic device according to claim 10, wherein acquiring the plurality of payment strategies comprises:

acquiring a first position of the terminal device from the request;

acquiring a plurality of second positions of the plurality of storage devices where the plurality of data items are located from metadata associated with the plurality of data items; and acquiring a plurality of payment strategies, associated with data acquisition between the first position and the plurality of second positions, of the plurality of storage devices where the plurality of data items are located.

12. The electronic device according to claim 7, wherein the method further comprises:

searching a user profile associated with the terminal device for a configuration item associated with the recommendation criterion type;

determining, if the configuration item is found in the user profile, the recommendation criterion type based on the configuration item; and determining, if the configuration item is not found in the user profile, the recommendation criterion type based on the application type.

13. A non-transitory computer-readable storage medium storing computer instructions, wherein the computer instructions are used to enable a computer to perform a method, the method comprising:

receiving a request for a data item from a terminal device, the request comprising an identifier for identifying the data item and a type of use of the data item;

determining an application type at least based on the type of use of the data item, wherein the type of use is determined as being either related to disaster recovery or data analysis;

determining, based on the application type, a recommendation criterion type matching the request;

determining a plurality of data items associated with the identifier, the plurality of data items being located in a plurality of storage devices, wherein at least some of the plurality of storage devices are located in a different geographic location; and determining, based on the recommendation criterion type, a recommended data item from the plurality of data items as a response to the request, wherein if the recommendation criterion type is determined as a performance-sensitive type, determining, based on where the plurality of data items are located, a plurality of network performances or a plurality of system performances associated with the plurality of storage devices, and determining, based on the plurality of network performances or the plurality of system performances, the recommended data item from the plurality of data items; and wherein a network performance of the plurality of network performances comprises at least one of delay, throughput, and a data packet loss rate, and the system performance of the plurality of system performances comprises at least one of input and output performance, processor performance, and memory performance.

14. The non-transitory computer-readable storage medium according to claim 13, wherein determining the recommendation criterion type comprises:

determining that the recommendation criterion type is a performance-sensitive type, if it is determined that the application type is related to the disaster recovery type of use; and determining that the recommendation criterion type is a cost-sensitive type, if it is determined that the application type is related to the data analysis type of use.

15. The non-transitory computer-readable storage medium according to claim 13, wherein determining the recommended data item comprises:

if the recommendation criterion type is determined as a performance-sensitive type, acquiring a first position of the terminal device from the request;

acquiring a plurality of second positions of the plurality of storage devices where the plurality of data items are located from metadata associated with the plurality of data items;

determining a plurality of distances between the first position and the plurality of second positions; and determining, based on the plurality of distances, the recommended data item from the plurality of data items.

\* \* \* \* \*